US012659686B2

(12) United States Patent
Suzuki et al.

(10) Patent No.: US 12,659,686 B2
(45) Date of Patent: Jun. 16, 2026

(54) INFORMATION PROCESSING APPARATUS, INFORMATION PROCESSING METHOD, AND PROGRAM

(71) Applicant: Sony Group Corporation, Tokyo (JP)

(72) Inventors: Junya Suzuki, Kanagawa (JP); Kentaro Kimura, Tokyo (JP)

(73) Assignee: Sony Group Corporation, Tokyo (JP)

( * ) Notice: Subject to any disclaimer, the term of this patent is extended or adjusted under 35 U.S.C. 154(b) by 221 days.

(21) Appl. No.: 18/278,927

(22) PCT Filed: Jan. 13, 2022

(86) PCT No.: PCT/JP2022/000832
§ 371 (c)(1),
(2) Date: Aug. 25, 2023

(87) PCT Pub. No.: WO2022/185725
PCT Pub. Date: Sep. 9, 2022

(65) Prior Publication Data

US 2024/0137724 A1 Apr. 25, 2024
US 2024/0236603 A9 Jul. 11, 2024

(30) Foreign Application Priority Data

Mar. 5, 2021 (JP) ................................ 2021-035102

(51) Int. Cl.
*H04S 7/00* (2006.01)

(52) U.S. Cl.
CPC .......... *H04S 7/304* (2013.01); *H04S 2400/13* (2013.01); *H04S 2420/01* (2013.01)

(58) Field of Classification Search
None
See application file for complete search history.

(56) References Cited

U.S. PATENT DOCUMENTS 5,696,834 A 12/1997 Kitagawa
2002/0164037 A1* 11/2002 Sekine .................. H04S 7/304 381/17

(Continued)

FOREIGN PATENT DOCUMENTS

EP 966179 A2 12/1999
JP H05-119770 A 5/1993

(Continued)

OTHER PUBLICATIONS

International Search Report and English translation thereof mailed Mar. 1, 2022 in connection with International Application No. PCT/JP2022/000832.

(Continued)

*Primary Examiner* — Qin Zhu
(74) *Attorney, Agent, or Firm* — Wolf, Greenfield & Sacks, P.C.

(57) ABSTRACT

The present technology relates to an information processing apparatus, an information processing method, and a program capable of appropriately reproducing a sense of distance from a user to a virtual sound source and an apparent size of the virtual sound source in spatial sound representation. The present technology includes a sound source setting unit that sets a first sound source, and a plurality of second sound sources at positions corresponding to a size of a sound image of a first sound that is a sound of the first sound source; and an output control unit that outputs first sound data obtained by convolution processing using HRTF information corresponding to a position of the first sound source and a plurality of pieces of second sound data obtained by convolution processing using HRTF information corresponding to the positions of the second sound sources. The second sound sources are set to be positioned around the first sound source. The present technology can be applied to a device (Continued)

that outputs sound from a reproducing device such as headphones.

11 Claims, 22 Drawing Sheets

(56) References Cited

U.S. PATENT DOCUMENTS

| | | | | |
|---|---|---|---|---|
| 2009/0136048 | A1* | 5/2009 | Yoo | H04S 3/008 381/1 |
| 2017/0325045 | A1 | 11/2017 | Baek | |
| 2019/0020968 | A1* | 1/2019 | Suenaga | H04S 7/303 |
| 2020/0008004 | A1 | 1/2020 | Eronen | |
| 2023/0247384 | A1* | 8/2023 | Okimoto | H04R 5/033 381/303 |

FOREIGN PATENT DOCUMENTS

| | | | | |
|---|---|---|---|---|
| JP | 2010-004512 | A | 1/2010 | |
| JP | 2013-038511 | A | 2/2013 | |
| JP | 2019087973 | A | 6/2019 | |
| WO | WO-2015114358 | A1 | 8/2015 | |
| WO | WO-2019156892 | A1 * | 8/2019 | G06K 9/00624 |

OTHER PUBLICATIONS

International Written Opinion and English translation thereof mailed Mar. 1, 2022 in connection with International Application No. PCT/JP2022/000832.

International Preliminary Report on Patentability and English translation thereof mailed Sep. 14, 2023 in connection with International Application No. PCT/JP2022/000832.

Extended European Search Report for European Application No. 22762784.1 dated Jul. 19, 2024.

* cited by examiner

A

B

INFORMATION PROCESSING APPARATUS, INFORMATION PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2022/000832, filed in the Japanese Patent Office as a Receiving Office on Jan. 13, 2022, which claims priority to Japanese Patent Application Number JP2021-035102, filed in the Japanese Patent Office on Mar. 5, 2021, each of which is hereby incorporated by reference in its entirety.

TECHNICAL FIELD

The present technology particularly relates to an information processing apparatus, an information processing method, and a program capable of appropriately reproducing a sense of distance from a user to a virtual sound source and an apparent size of the virtual sound source in spatial sound representation.

BACKGROUND ART

As a method of making a user recognize a space using sound, a method of representing the direction, distance, movement, and the like of a virtual sound source by computation using a head-related transfer function (HRTF) is known.

CITATION LIST

Patent Literature

[PTL 1]
JP 2010-004512A

SUMMARY

Technical Problem

Representation of the direction and distance of a virtual sound source is important to make the user recognize the space using sound. Although the direction of the virtual sound source can be represented by computation using HRTF, it is difficult to sufficiently represent the sense of distance from the user to the virtual sound source by conventional methods.

The present technology has been made in view of such circumstances, and is intended to appropriately reproduce the sense of distance from the user to the virtual sound source and the apparent size of the virtual sound source.

Solution to Problem

An information processing apparatus according to one aspect of the present technology includes a sound source setting unit that sets a first sound source, and a plurality of second sound sources at positions corresponding to a size of a sound image of a first sound that is a sound of the first sound source; and an output control unit that outputs first sound data obtained by convolution processing using HRTF information corresponding to a position of the first sound source and a plurality of pieces of second sound data obtained by convolution processing using HRTF information corresponding to the positions of the second sound sources, wherein the second sound sources are set to be positioned around the first sound source.

In one aspect of the present technology, a first sound source and a plurality of second sound sources are set, the second sound sources being set at positions corresponding to a size of a sound image of a first sound that is a sound of the first sound source, and first sound data obtained by convolution processing using HRTF information corresponding to a position of the first sound source and a plurality of pieces of second sound data obtained by convolution processing using HRTF information corresponding to the positions of the second sound sources are output. The second sound sources are set to be positioned around the first sound source.

DESCRIPTION OF EMBODIMENTS

Figure 1:
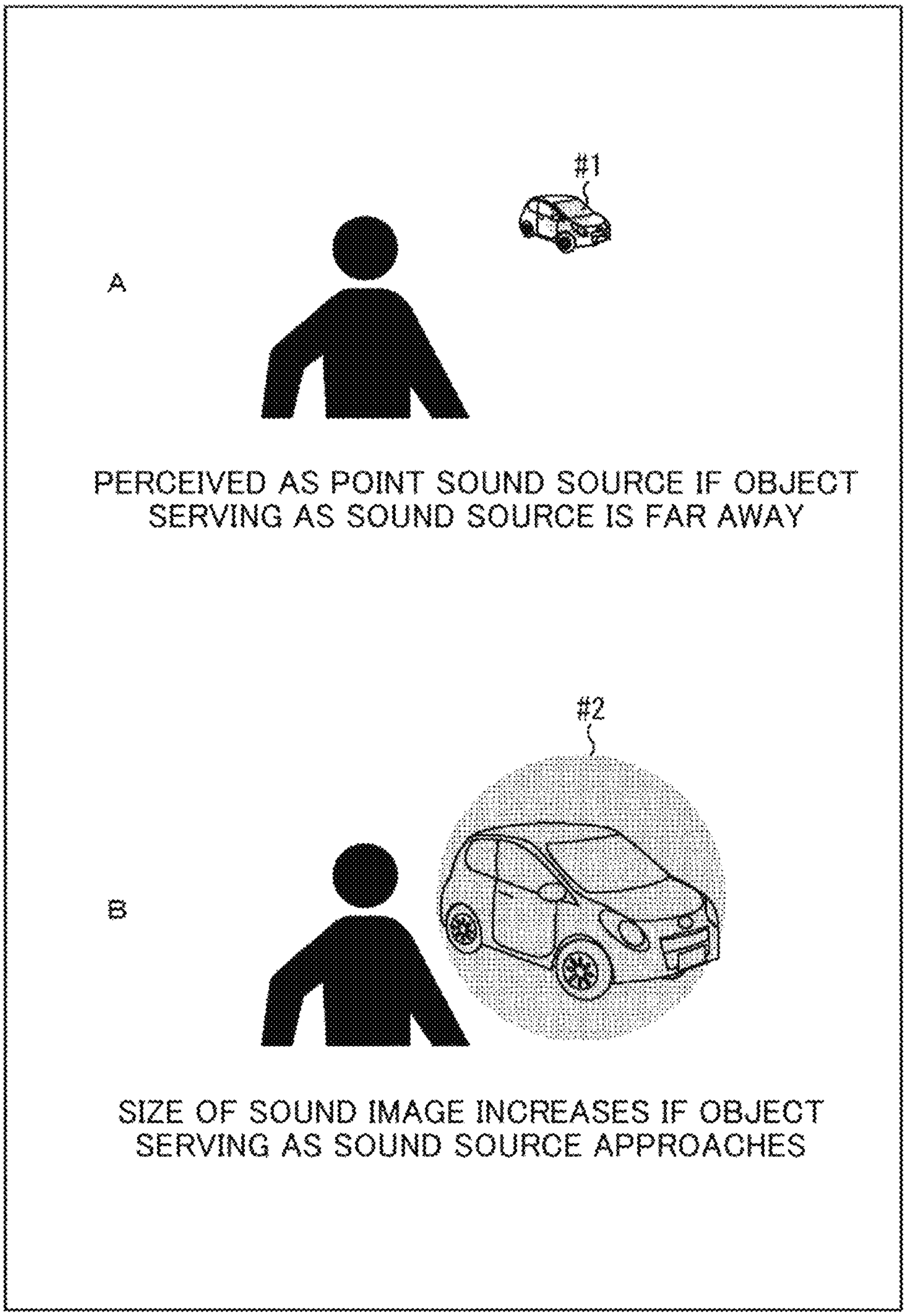
FIG. 1 is a diagram showing an example of how a listener perceives sound.

An embodiment for implementing the present technology will be described below. The description will be made in the following order.

1. Description of how sound is perceived
2. Distance representation using multiple sound sources
3. Configuration example of sound reproducing system and information processing apparatus
4. Description of operation of information processing apparatus
5. Modification example (application example)
6. Other examples

1. Description of how Sound is Perceived

FIG. 1 is a diagram showing an example of how a listener perceives sound.

In FIG. 1, a car is shown as a sound source object. It is assumed that the car is traveling while emitting sounds such as engine sound and traveling sound.

The way the user, who is a listener, perceives the sound changes according to the distance from the car.

In the example of FIG. 1A, the car is located far away from the user. In this case, the user perceives the sound from the car as the sound from a point sound source. In the example of FIG. 1A, the point sound source perceived by the user is represented by a small colored circle #1.

On the other hand, in the example of B of FIG. 1, the car is located near the user. In this case, the user perceives the sound from the car as sound having a loudness as represented by a colored circle #2 surrounding the car. In the present specification, the apparent loudness of sound perceived by the user is referred to as the size of the sound image.

In this way, the user perceives the sense of distance to the sound source by perceiving the size of the sound image.

2. Distance Representation Using Multiple Sound Sources

Figure 2:
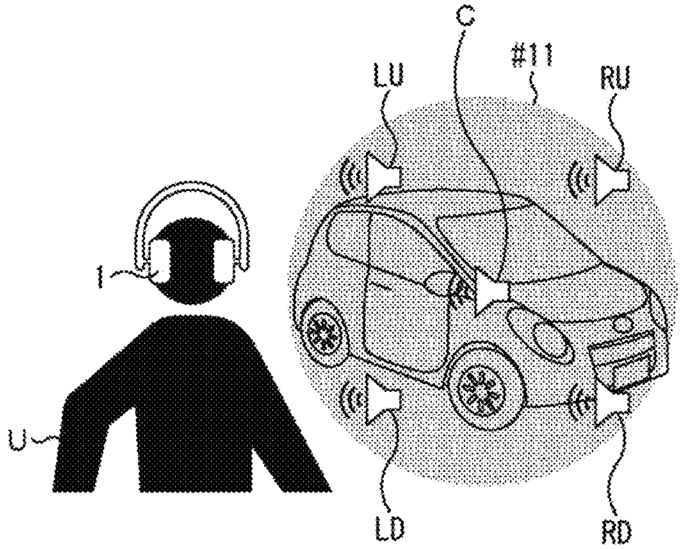
FIG. 2 is a diagram showing an example of distance representation in the present technology.

FIG. 2 is a diagram showing an example of distance representation in the present technology.

In the present technology, the distance from the user to an object serving as a virtual sound source is represented by controlling the size of the sound image. By changing the size of the sound image that the user hears, it is possible to make the user perceive the sense of distance from the user to the virtual sound source.

As shown in FIG. 2, in the present technology, a user U wears an output device such as headphones 1 and listens to the sound from a car, which is a virtual sound source. The sound from the virtual sound source is reproduced by, for example, a smartphone carried by the user U and output from the headphones 1.

In the example of FIG. 2, the sound of a car as an object corresponding to the virtual sound source is composed of sounds from a central sound source C and four ambient sound sources U, that is, ambient sound sources LU, RU, LD, and RD. Here, the central sound source C and the ambient sound source U are virtual sound sources represented by computation using HRTF. In FIG. 2, the central sound source C and the ambient sound sources LU, RU, LD, and RD are illustrated as speakers. The same applies to other figures to be described later.

In the present technology, sound is presented by, for example, converting the sound from each sound source generated by computation using the head-related transfer functions (HRTF) corresponding to the positions of the central sound source and the ambient sound sources into L/R 2-channel sound and outputting the same from the headphones 1.

The sound from the central sound source is the central sound that represents the sound of the object serving as the virtual sound source, and is called the central sound in the present specification. The sound from the ambient sound source is the sound that represents the size of the sound image of the central sound, and is called the ambient sound in the present specification.

As shown in FIG. 2, in the present technology, by changing the size of the sound image of the central sound, the user can perceive the sense of distance to the object that is the virtual sound source. In the present technology, the size of the sound image of the central sound is controlled by changing the positions of the ambient sound sources.

In the example of FIG. 2, the car as the virtual sound source object is shown near the user, but the virtual sound source object may or may not be near the user. Further, an object that serves as a virtual sound source may or may not have an entity.

According to the present technology, it is possible to represent an object around the user as if it is a sound source. In addition, according to the present technology, it is possible to represent sounds as if they are coming from an empty space around the user.

By listening to the central sound and a plurality of ambient sounds, the user feels that the sound image of the central sound representing the sound from the virtual sound source has a size as indicated by a colored circle #11. As described with reference to FIG. 1, since the user perceives a sense of distance to an object serving as a virtual sound source according to the perceived size of the sound image, when a large sound image is represented as shown in FIG. 2, the user perceives it as if a car serving as a virtual sound source is nearby.

In this way, the user can perceive a sense of distance from the user to the object serving as the virtual sound source in the spatial sound, and can experience the spatial sound with a sense of reality.

Figure 3:
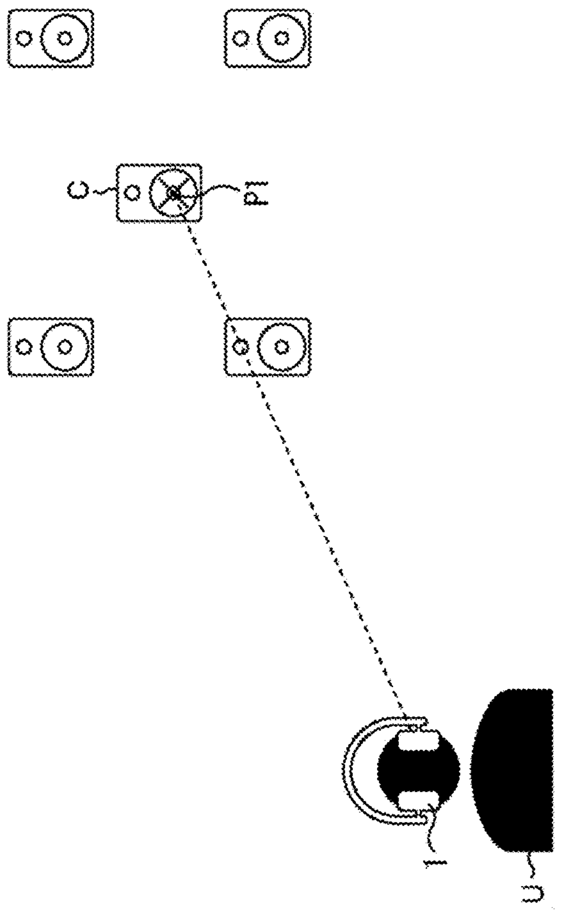
FIG. 3 is a diagram showing the positional relationship between a central sound source and a user.

FIG. 3 is a diagram showing the positional relationship between the central sound source and the user.

As shown in FIG. 3, a central sound source C, which is a virtual sound source, is set at a position P1, which is the center position of a sound image to be perceived by the user. The position P1 is a position in a direction shifted by a predetermined horizontal angle Azim (d: degree) and a predetermined vertical angle Elev (d) from the front direction of the user, for example. The distance from the user to the position P1 is a distance L (m), which is a predetermined distance.

The central sound, which is the sound of the central sound source C, is the central sound representing the sound of the object that is the virtual sound source. Further, the central sound is used as a reference sound for making the user perceive the sense of distance from the user to the virtual sound source.

A plurality of ambient sound sources are set around the central sound source C set in this way. For example, the plurality of ambient sound sources are arranged at regular intervals on a circle around the central sound source C.

Figure 4:
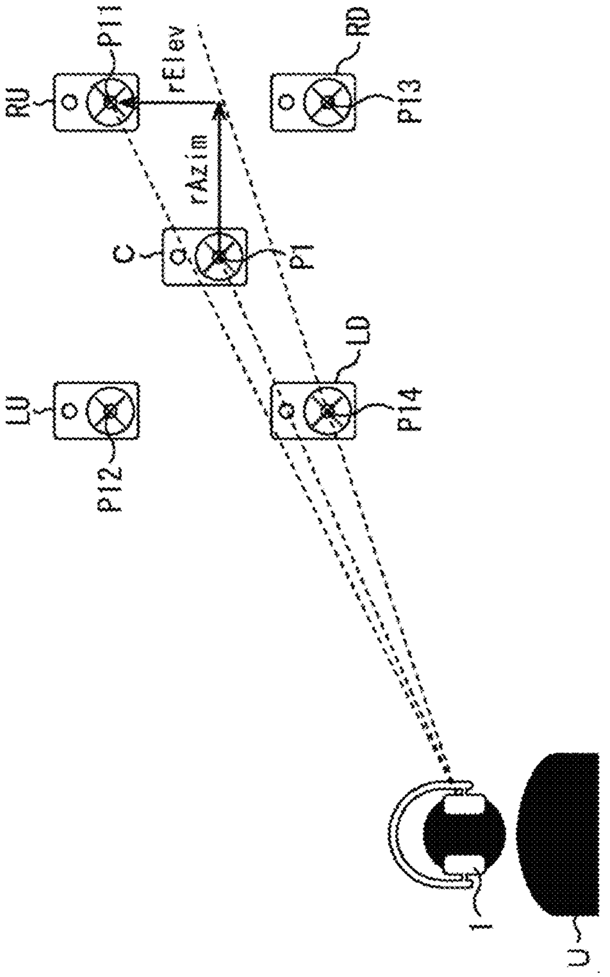
FIG. 4 is a diagram showing the positional relationship between a central sound source and ambient sound sources.

FIG. 4 is a diagram showing the positional relationship between the central sound source and the ambient sound sources.

As shown in FIG. 4, four ambient sound sources LU, RU, LD, and RD are arranged around the central sound source C.

The ambient sounds, which are the sounds of the ambient sound sources LU, RU, LD, and RD, are sounds for representing the size of the sound image of the central sound. By listening to the central sound and the ambient sounds, the user feels that the sound image of the central sound has a size. This allows the user to perceive the sense of distance to the object, which is the virtual sound source.

For example, the ambient sound source RU is arranged at a position P11 which is a horizontal angle rAzim (d) and a vertical angle rElev (d) away from the position P1 where the central sound source C is arranged with respect to the user U. Similarly, the remaining ambient sound sources LU, RD, and LD are arranged at positions P12, P13, and P14, which are set with reference to the position P1.

A position P12 where the ambient sound source LU is arranged is a position which is a horizontal angle −rAzim (d) and a vertical angle rElev (d) away from the position P1. A position P13 where the ambient sound source RD is arranged is a position which is a horizontal angle rAzim (d) and a vertical angle rElev (d) away from the position P1. A position P14 where the ambient sound source LD is arranged is a position which is a horizontal angle −rAzim (d) and a vertical angle −rElev (d) away from the position P1.

For example, the distances from the central sound source C to each ambient sound source are the same. In this way, the four ambient sound sources LU, RU, LD, and RD are arranged radially with respect to the central sound source C.

Figure 5:
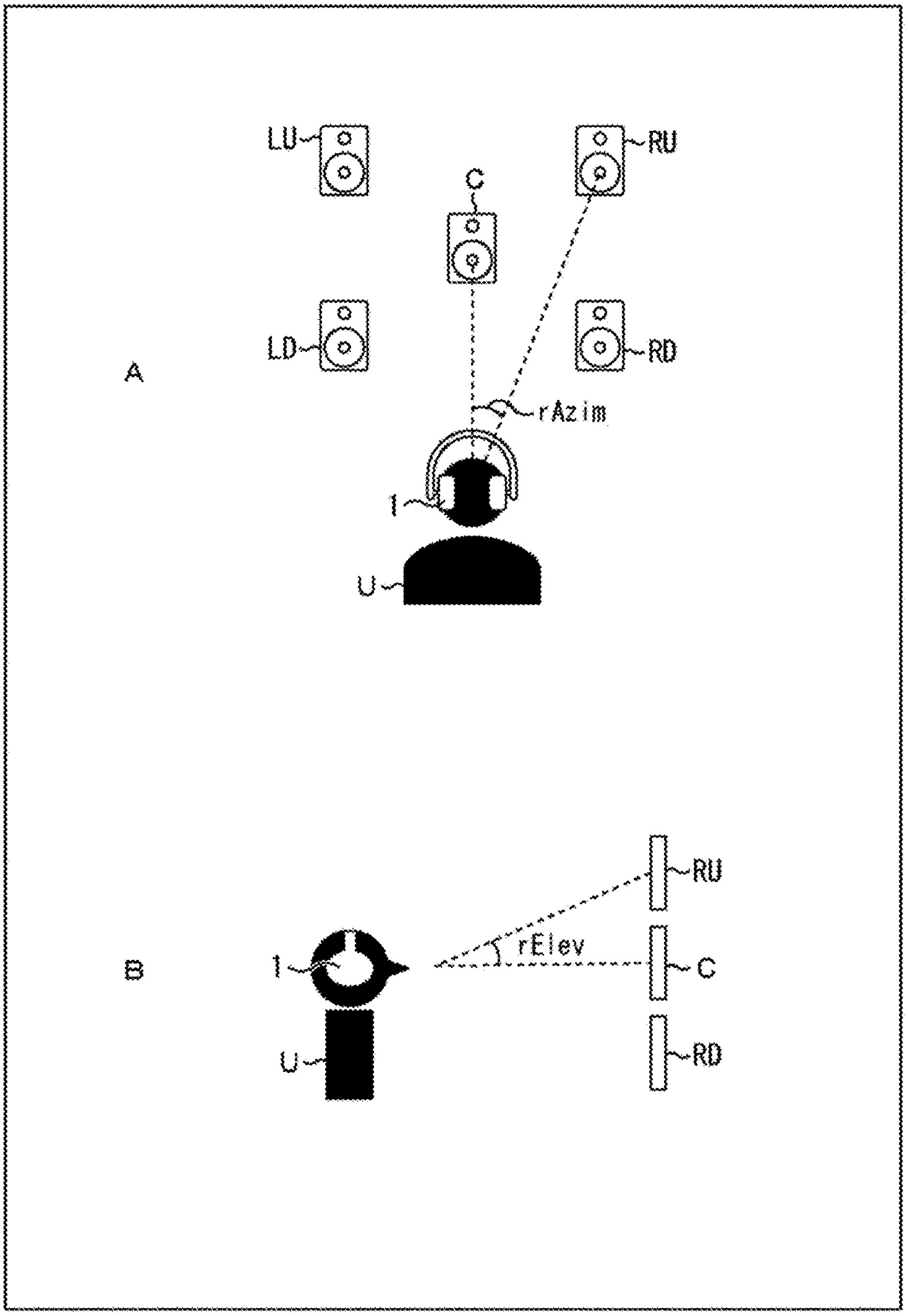
FIG. 5 is another diagram showing the positional relationship between the central sound source and the ambient sound sources.

FIG. 5 is another diagram showing the positional relationship between the central sound source and the ambient sound sources.

For example, when the central sound source and the ambient sound sources are viewed obliquely from above, the positional relationship between the central sound source and the ambient sound sources is the relationship shown in FIG. 5A. Further, when the central sound source and the ambient sound sources are viewed from the side, the positional relationship between the central sound source and the ambient sound sources is the relationship shown in FIG. 5B.

The positions of the plurality of ambient sound sources set around the central sound source C as described above are different depending on the size of the sound image of the central sound to be perceived by the user.

Although an example in which four ambient sound sources are set has been described as a representative example, the number of ambient sound sources is not limited to this.

Figure 6:
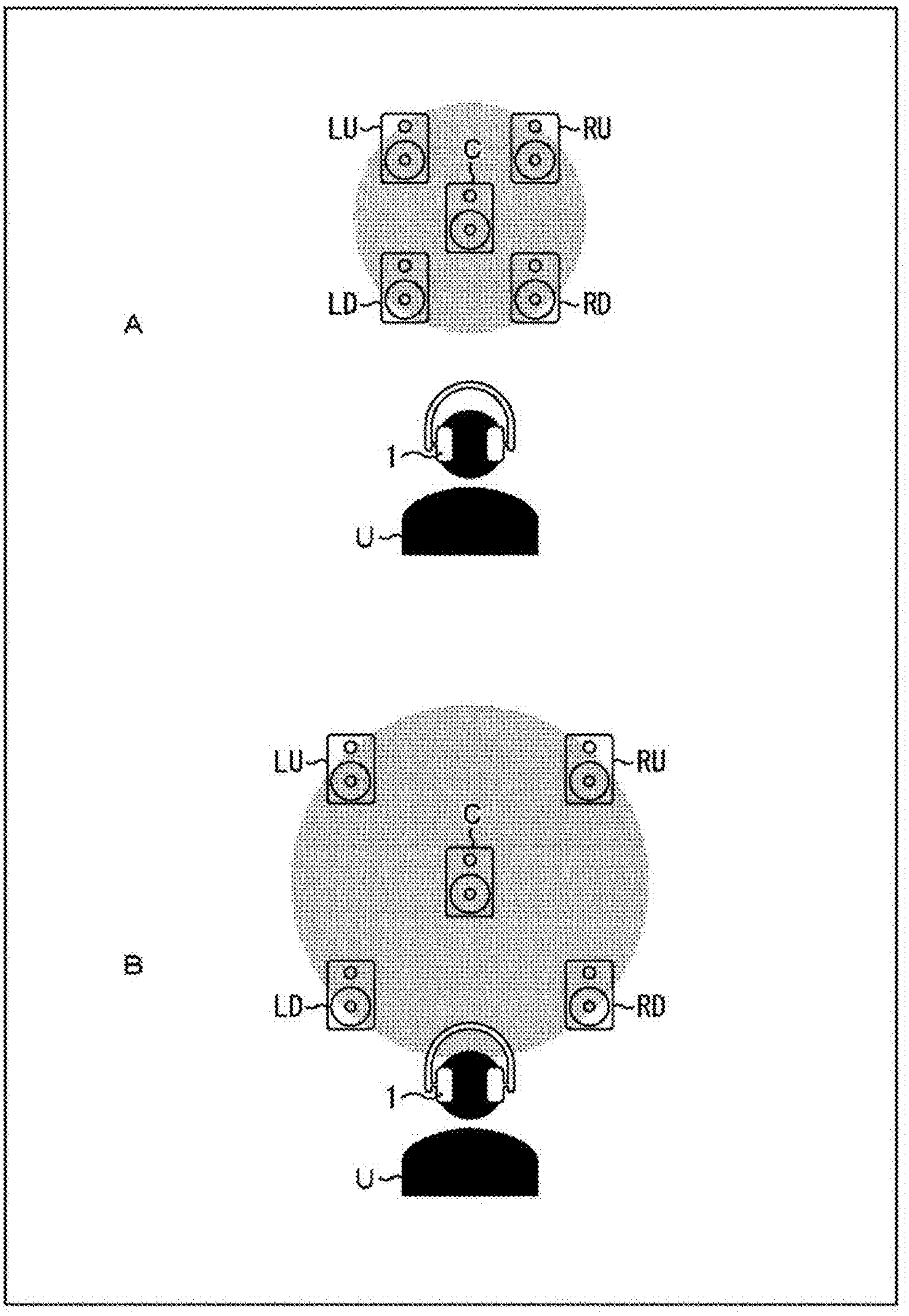
FIG. 6 is another diagram showing an example of distance representation in the present technology.

FIG. 6 is another diagram showing an example of distance representation in the present technology.

FIG. 6A represents the positions of the ambient sound sources when the distance from the user U wearing the headphones 1 to the virtual sound source is long. As shown in FIG. 6A, by arranging the ambient sound sources near the central sound source and representing the size of the sound image of the central sound in a small size, the user perceives the distance to the virtual sound source as being far away. As described above, the smaller the perceived sound image, the farther the user perceives the virtual sound source.

FIG. 6B represents the positions of the ambient sound sources when the distance from the user U wearing the headphones 1 to the virtual sound source is short. As shown in FIG. 6B, by arranging the ambient sound sources at a position away from the central sound source and representing the size of the sound image of the central sound in a large size, the user perceives the virtual sound source as being nearby. As described above, the larger the perceived sound image, the closer the user perceives the virtual sound source.

According to the present technology, by controlling the positions of the ambient sound sources arranged around the central sound source, the user can perceive different distances to the virtual sound sources.

Figure 7:
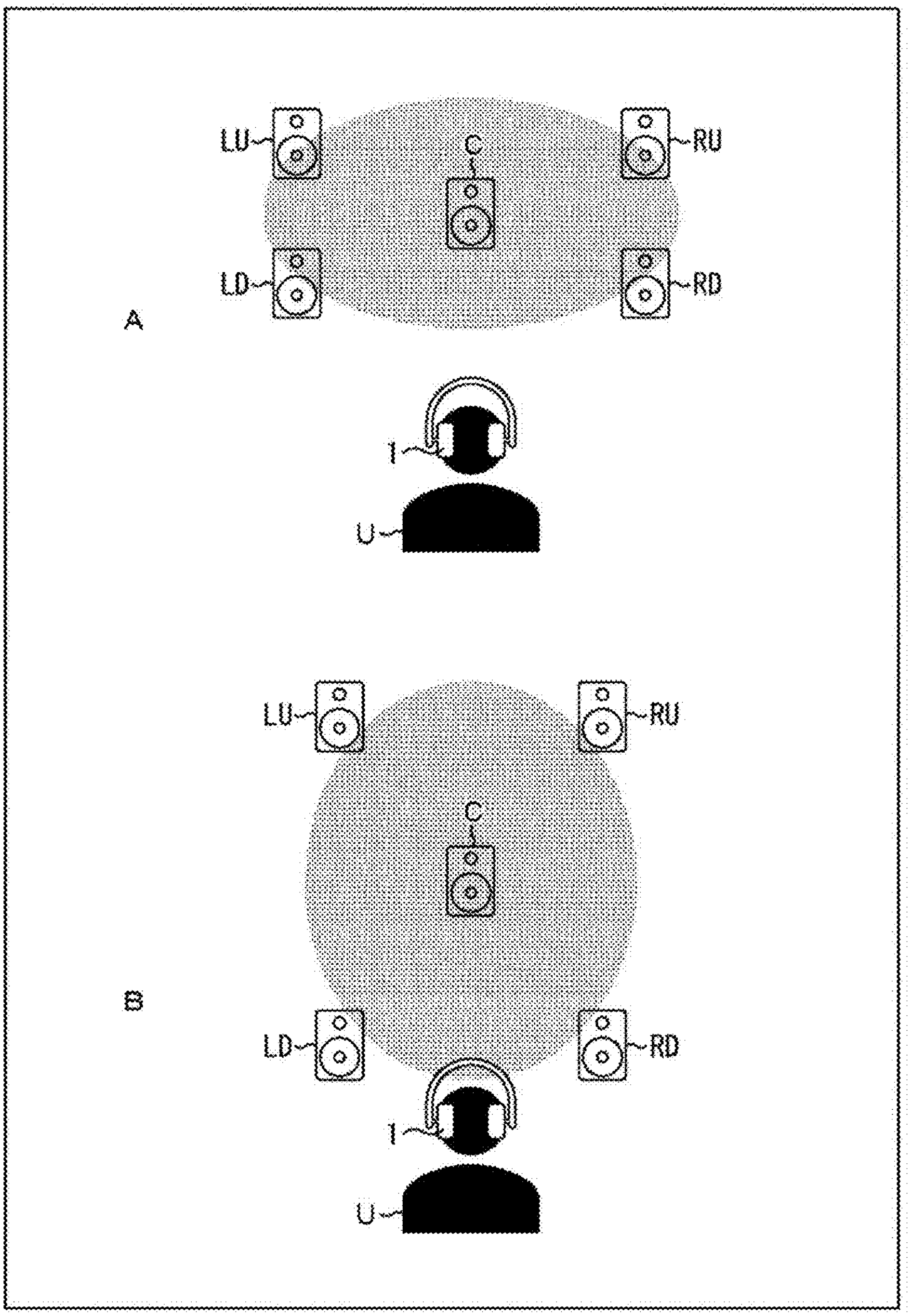
FIG. 7 is a diagram showing the shape of a sound image in the present technology.

FIG. 7 is a diagram showing the shape of a sound image according to the present technology.

FIG. 7A shows the shape of the sound source when the absolute value of the horizontal angle between the central sound source and the ambient sound source is greater than the absolute value of the vertical angle. In this case, the shape of the sound image of the central sound perceived by the user is horizontally long as indicated by a colored ellipse.

FIG. 7B shows the shape of the sound source when the absolute value of the vertical angle between the central sound source and the ambient sound source is greater than the absolute value of the horizontal angle. In this case, the shape of the sound image of the central sound perceived by the user is vertically long as indicated by a colored ellipse.

In this way, by changing the position of the ambient sound to an arbitrary position, it is possible to represent the distance even for a virtual sound source having a characteristic shape such as a vertically or horizontally long shape.

3. Configuration Example of Sound Reproducing System and Information Processing Apparatus Next, configurations of a sound reproducing system and an information processing apparatus to which the present technology is applied will be described.

Figure 8:
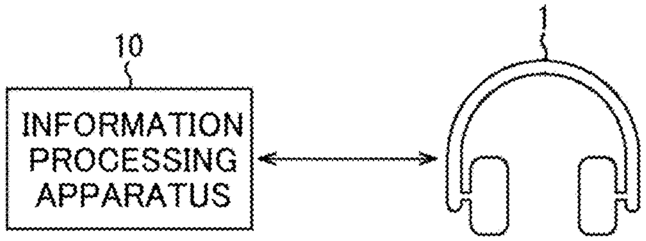
FIG. 8 is a diagram showing a configuration example of a sound reproducing system to which the present technology is applied.

FIG. 8 illustrates a configuration example of the sound reproducing system to which the present technique is applied. The sound reproducing system is configured by connecting the information processing apparatus 10 and the headphones 1.

In the present technology, for example, a user wears the headphones 1 and carries the information processing apparatus 10. A user can experience the spatial sound of the present technology by listening to the sound corresponding to the sound data processed by the information processing apparatus 10 through the headphones 1 connected to the information processing apparatus 10.

The information processing apparatus 10 is, for example, a smartphone, a mobile phone, a PC, a television, a tablet, or the like possessed by the user.

Moreover, the headphones 1 are also called a reproducing device, and an earphone or the like is assumed in addition to the headphones 1. The headphones 1 are worn on the user's head, more specifically, on the user's ears, and are connected to the information processing apparatus 10 by wire or wirelessly.

Figure 9:
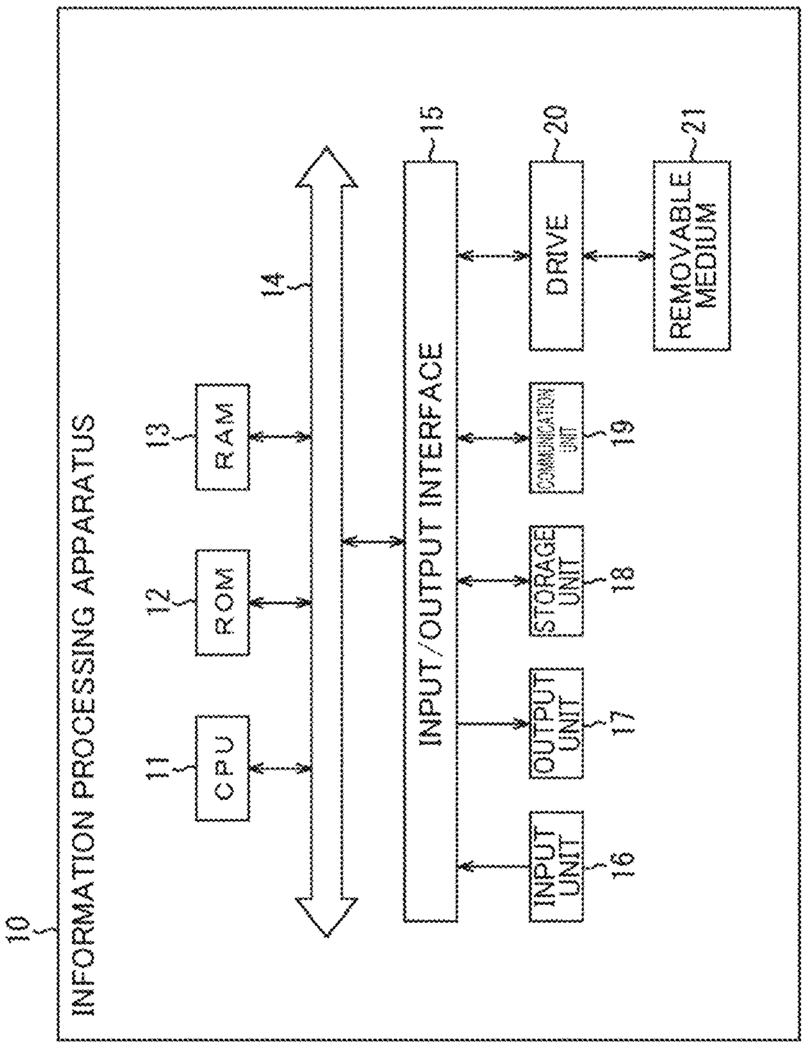
FIG. 9 is a block diagram showing a hardware configuration example of an information processing apparatus 10.

FIG. 9 is a block diagram illustrating a configuration example of hardware of the information processing apparatus 10.

As illustrated in FIG. 9, the information processing apparatus 10 includes a central processing unit (CPU) 11, a read-only memory (ROM) 12, and a random access memory (RAM) 13, which are connected to each other via a bus 14.

The information processing apparatus 10 also includes an input/output interface 15, an input unit 16 configured with various buttons and a touch panel, and an output unit 17 configured with a display, a speaker, and the like. The bus 14 is connected to the input/output interface 15 to which the input unit 16 and the output unit 17 are connected.

The information processing apparatus 10 further includes a storage unit 18 such as a hard disk or nonvolatile memory, a communication unit 19 such as a network interface, and a drive 20 for driving a removable medium 21. A storage unit 18, a communication unit 19, and a drive 20 are connected to the input/output interface 15.

The information processing apparatus 10 functions as an information processing apparatus that processes sound data reproduced by a reproducing device such as the headphones 1 worn by the user.

The communication unit 19 functions as an output unit that supplies audio data when the information processing apparatus 10 and the reproducing device are wirelessly connected.

The communication unit 19 may also function as an acquisition unit that acquires virtual sound source data and HRTF information via a network.

Figure 10:
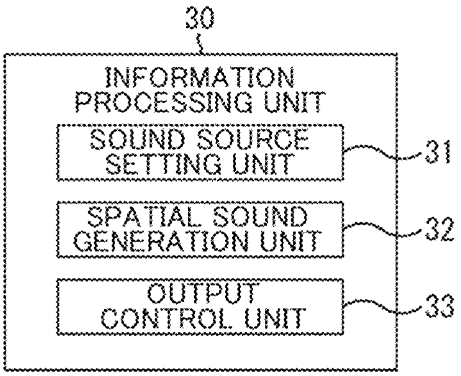
FIG. 10 is a block diagram showing a functional configuration example of the information processing apparatus 10.

FIG. 10 is a block diagram illustrating a functional configuration example of the information processing apparatus 10.

As shown in FIG. 10, the information processing unit 30 includes a sound source setting unit 31, a spatial sound generation unit 32, and an output control unit 33. Each configuration shown in FIG. 10 is realized by the CPU 11 shown in FIG. 9 executing a predetermined program.

The sound source setting unit 31 sets a virtual sound source for representing a sense of distance at a predetermined position. Further, the sound source setting unit 31 sets a central sound source according to the position of the virtual sound source, and sets ambient sound sources at positions according to the distance to the virtual sound source.

The spatial sound generation unit 32 generates sound data of sounds from the central sound source and ambient sound sources set by the sound source setting unit 31.

For example, the spatial sound generation unit 32 performs convolution processing on the virtual sound source data based on HRTF information corresponding to the position of the central sound source to generate sound data of the central sound. The spatial sound generation unit 32 also performs convolution processing on the virtual sound source data based on HRTF information corresponding to the position of each ambient sound source to generate sound data of each ambient sound.

Even if the virtual sound source data to be subjected to convolution processing based on HRTF information corresponding to the position of the central sound source and the virtual sound source data to be subjected to convolution processing based on HRTF information corresponding to the positions of the ambient sound sources may be the same data and may be different data.

The output control unit 33 converts the sound data of the central sound and the sound data of each ambient sound generated by the spatial sound generation unit 32 into L/R sound data. The output control unit 33 controls the output unit 17 or the communication unit 19 to output the converted sound data from the reproducing device worn by the user.

In addition, the output control unit 33 appropriately adjusts the volume of the central sound and the volume of each ambient sound. For example, it is possible to decrease the volume of the ambient sound to decrease the size of the sound image of the central sound, or increase the volume of the ambient sound to increase the size of the central sound image. Further, the volume values of the respective ambient sounds can be set to either the same value or different values.

In this manner, the information processing unit 30 sets the virtual sound source and also sets the central sound source and the ambient sound sources. Further, the information processing unit 30 performs convolution processing based on HRTF information corresponding to the positions of the central sound source and the ambient sound sources, thereby generating sound data of the central sound and the ambient sounds, and outputting them to the reproducing device.

HRTF data corresponding to the position of the central sound source and HRTF data corresponding to the positions of the ambient sound sources may be synthesized by, for example, multiplying them on the frequency axis, and processing equivalent to the above-described processing may be realized using the synthesized HRTF data. The synthesized HRTF data becomes HRTF data for representing the area, which is the apparent size of the virtual sound source.

If the central sound source and the ambient sound sources are the same, there is an effect that the amount of computation is reduced.

4. Description of Operation of Information Processing Apparatus

Figure 11:
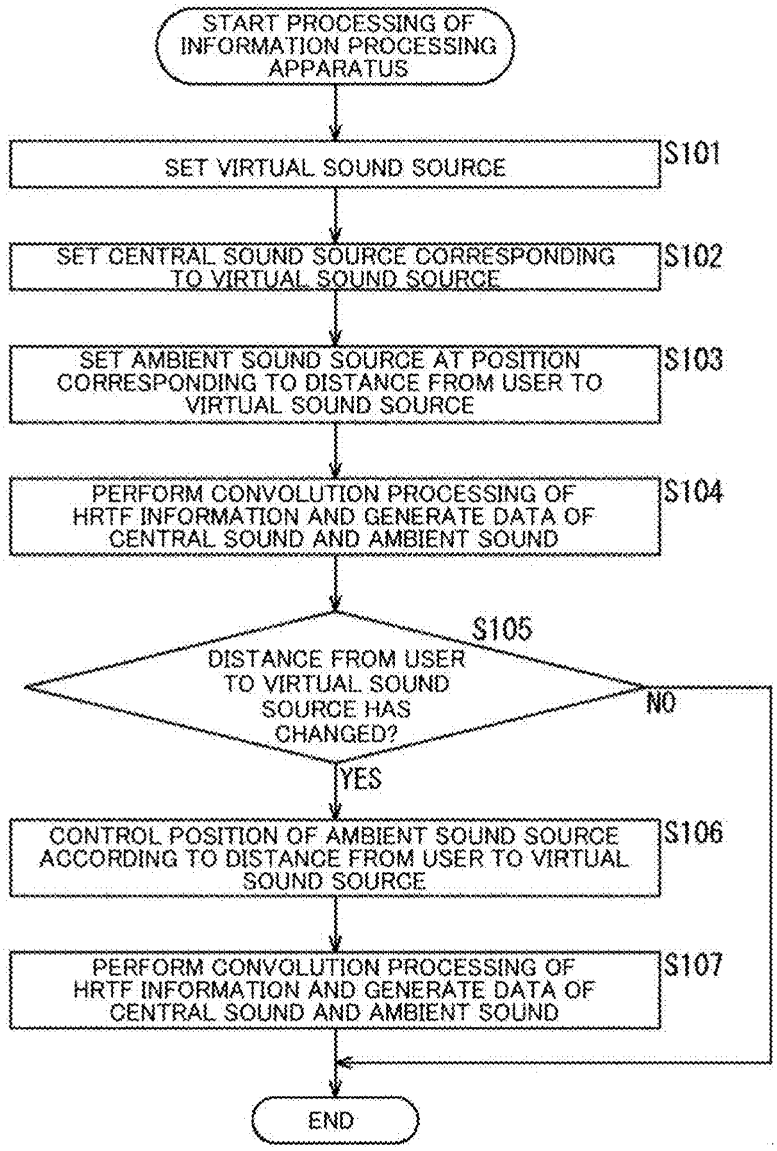
FIG. 11 is a flowchart for explaining processing of the information processing apparatus 10.

The processing of the information processing apparatus 10 will be described with reference to the flowchart of FIG. 11.

In step S101, the sound source setting unit 31 sets a virtual sound source at a predetermined position.

In step S102, the sound source setting unit 31 sets the central sound source according to the position of the virtual sound source.

In step S103, the sound source setting unit 31 sets an ambient sound source according to the distance from the user to the virtual sound source. In steps S101 to S103, the sound volume of each sound source is appropriately set.

In step S104, the spatial sound generation unit 32 performs convolution processing based on the HRTF information to generate sound data of the central sound, which is the sound of the central sound source, and the ambient sound, which is the sound of the ambient sound sources. The sound data of the central sound and the sound data of the ambient sounds generated by the convolution processing based on the HRTF information are supplied to the reproducing device and used for outputting the central sound and the ambient sounds.

In step S105, the sound source setting unit 31 determines whether the distance from the user to the virtual sound source changes.

If it is determined in step S105 that the distance from the virtual sound source to the user changes, the sound source setting unit 31 controls the positions of the ambient sound sources according to the changed distance in step S106. For example, when representing that a virtual sound source approaches, the sound source setting unit 31 controls the position of each ambient sound source to move away from the central sound source. Further, when representing that the virtual sound source moves away, the sound source setting unit 31 controls the position of each ambient sound source to approach the central sound source.

In step S107, the spatial sound generation unit 32 performs convolution processing based on the HRTF information to generate data of the central sound and ambient sounds that are set again according to the distance to the virtual sound source. After the central sound and ambient sounds are output using the sound data generated by the convolution processing based on the HRTF information, the processing ends.

On the other hand, if it is determined in step S105 that the distance from the user to the virtual sound source does not change, the processing ends similarly. The above-described processing is repeated while the user listens to the sound of the virtual sound source.

Through the above-described processing, the information processing apparatus 10 can appropriately represent the sense of distance from the user to the virtual sound source.

The user can perceive the distance to the virtual sound source through a realistic spatial sound experience.

Figure 12:
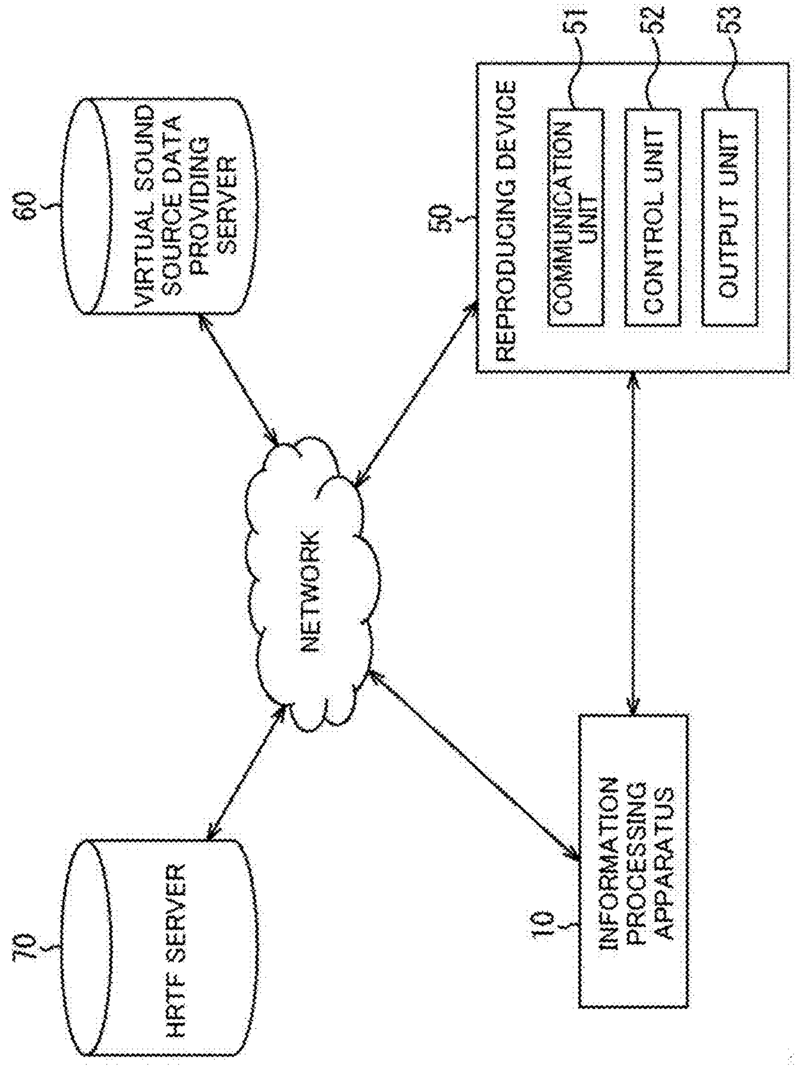
FIG. 12 is a diagram showing another configuration example of a sound reproducing system to which the present technology is applied.

FIG. 12 illustrates another configuration example of the sound reproducing system to which the present technique is applied.

As shown in FIG. 12, the sound reproducing system to which the present technology is applied may have the information processing apparatus 10, a reproducing device 50, a virtual sound source data providing server 60, and an HRTF server 70. In the example of FIG. 12, the reproducing device 50 is shown in place of the headphones 1. The reproducing device 50 is a general term for devices such as the headphones 1 and earphones worn by the user to listen to sounds.

As shown in FIG. 12, it is also assumed that the information processing apparatus 10 and the reproducing device 50 function by receiving data provided from the virtual sound source data providing server 60, the HRTF server 70, or the like connected via a network such as the Internet.

For example, the information processing apparatus 10 communicates with the virtual sound source data providing server 60 to acquire virtual sound source data provided from the virtual sound source data providing server 60.

The information processing apparatus 10 also communicates with the HRTF server 70 and acquires HRTF information provided from the HRTF server 70. The HRTF information is data for adding the transfer characteristics from the virtual sound source to the user's ear (eardrum). That is, the HRTF information is data in which the head-related transfer function for localizing the sound image at the position of the virtual sound source is recorded for each direction of the virtual sound source viewed from the user.

The HRTF information acquired from the HRTF server 70 may be recorded in the information processing apparatus 10, or may be acquired from the HRTF server 70 each time the sound of the virtual sound source is output.

As the head-related transfer function, information recorded in the form of head-related impulse response (HRIR), which is information in the time domain, may be used, or information recorded in the form of HRTF, which is information in the frequency domain, may be used. In the present specification, description is given assuming that HRTF information is handled.

Further, the HRTF information may be personalized according to the physical characteristics of the individual user, or may be commonly used by a plurality of users.

For example, the personalized HRTF information may be information obtained by placing the subject in a test environment and performing actual measurements, or may be information calculated from the ear image of the subject. Information calculated based on the size information of the head and ear of the subject may be used as the personalized HRTF information.

The HRTF information used in common may be information obtained by measurement using a dummy head, or may be information obtained by averaging HRTF information of a plurality of persons. A user may compare reproduced sounds using a plurality of pieces of HRTF information, and the HRTF information that the user determines to be the most suitable may be used as the HRTF information used in common.

The reproducing device 50 in FIG. 12 has a communication unit 51, a control unit 52 and an output unit 53. In this case, the reproducing device 50 may perform at least some of the above-described functions of the information processing apparatus 10, and the reproducing device 50 may perform processing for generating the sound of the virtual sound source. The control unit 52 of the reproducing device 50 performs the above-described processing for acquiring virtual sound source data and HRTF information through communication in the communication unit 51 and generating virtual sound source sound.

In FIG. 12, the virtual sound source data providing server 60 and the HRTF server 70 are each composed of one device, but they may be composed of a plurality of devices on the cloud.

Further, the virtual sound source data providing server 60 and the HRTF server 70 may be realized by one device.

5. Modification Example (Application Example)

Figure 13:
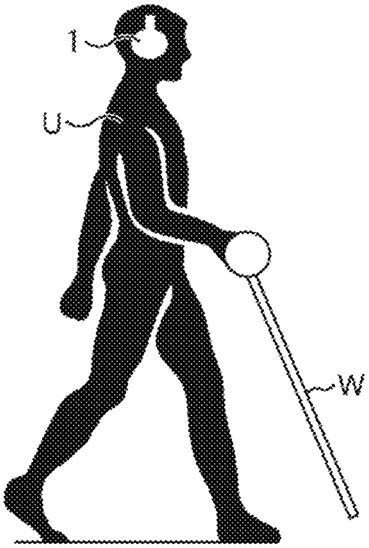
FIG. 13 is a diagram showing an example of an obstacle notification method to which the present technology is applied.

Notification of Obstacles Using Spatial Sound when Visually Impaired People Walk FIG. 13 is a diagram illustrating an example of an obstacle notification method to which the present technology is applied.

FIG. 13 shows a user U walking with a white cane W. The user U wears headphones 1. The white cane W held by the user U includes an ultrasonic speaker unit that emits ultrasonic waves, a microphone unit that receives reflected ultrasonic waves, and a communication unit that communicates with the headphones 1 (neither is shown).

The white cane W also includes a processing control unit that controls the output of ultrasonic waves from the ultrasonic speaker unit and processes sounds detected by the microphone unit. These configurations are provided in a housing formed at the upper end of the white cane W, for example.

The ultrasonic speaker unit and the microphone unit provided on the white cane W function as sensors, and the user U is notified of information about surrounding obstacles. Notification to the user U is performed using the sound of a virtual sound source that gives a sense of distance based on the size of the sound image.

Figure 14:
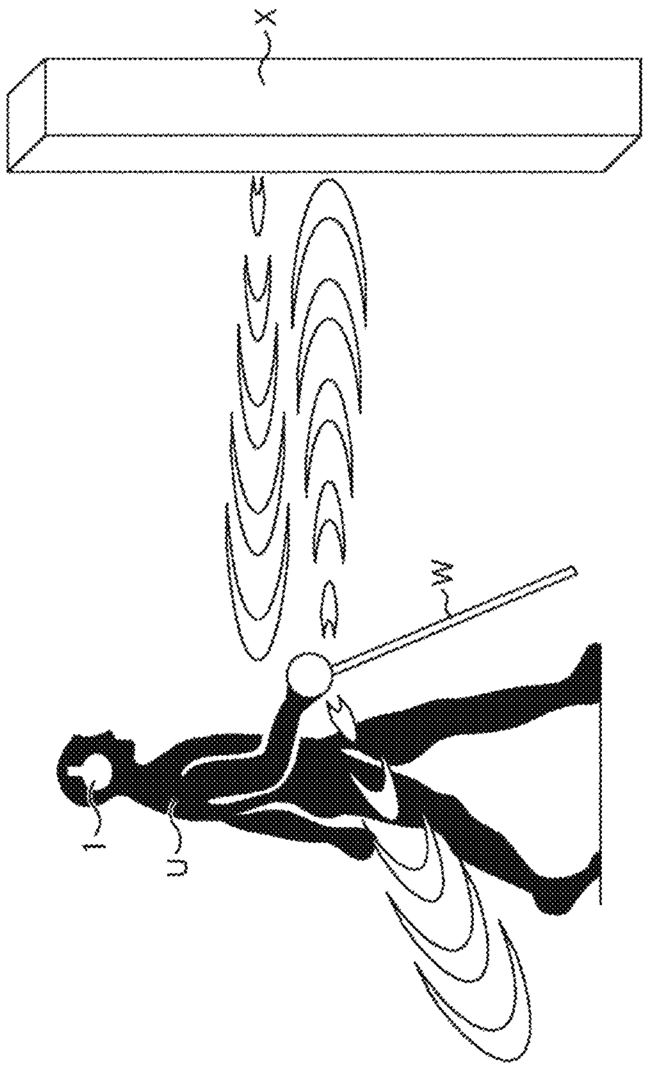
FIG. 14 is another diagram showing an example of an obstacle notification method to which the present technology is applied.

As shown in FIG. 14, the ultrasonic waves output from the ultrasonic speaker unit of the white cane W are reflected by the wall X, which is a surrounding obstacle. The ultrasonic waves reflected by the wall X are detected by the microphone unit of the white cane W. As a result, the processing control unit of the white cane W detects the distance to the wall X, which is a surrounding obstacle, and the direction of the wall X as spatial information.

When the processing control unit of the white cane W detects the distance to the wall X and the direction of the wall X, the processing control unit sets the wall X which is an obstacle as an object corresponding to a virtual sound source.

The processing control unit also sets a central sound source and an ambient sound source that represent the distance to the wall X and the direction of the wall X. For example, the central sound source is set in the direction of the wall X, and the ambient sound sources are set at positions corresponding to the size of the sound image representing the distance to the wall X.

The processing control unit uses data such as notification sounds as virtual sound source data, and performs convolution processing on the virtual sound source data based on HRTF information corresponding to the respective positions of the central sound source and the ambient sound sources to generate the sound data of the central sound and the ambient sound. The processing control unit transmits the sound data obtained by performing the convolution processing to the headphones 1 worn by the user U, and outputs the central sound and the ambient sound.

When walking with a normal white cane (a white cane without an ultrasonic speaker unit and a microphone unit), for example, a user who is visually impaired person can only obtain information about 1 meter around the user, and cannot obtain information about obstacles such as walls, steps, and cars several meters ahead, which poses a danger.

In this way, by representing the distance and direction of the obstacle detected by the white cane W with the spatial sound, the user U can perceive not only the direction of the surrounding obstacles but also the distance to the obstacle only by the sound. In addition to information on obstacles, the presence of an anterior lower space representing the edge of a platform, is also acquired as spatial information.

In this application example, the white cane W acquires distance information to surrounding obstacles by using the ultrasonic speaker unit and the microphone unit as sensors and represents the distance to the obstacle based on the acquired distance information using spatial sound.

For example, by repeating such processing at short intervals such as 50 ms, the user can immediately know information such as surrounding obstacles even while walking.

In FIGS. 13 and 14, all the configurations of the ultrasonic speaker unit, the microphone unit, the processing control unit, and the output control unit are provided in the white cane W. However, at least one of these configurations may be provided as a device separate from the white cane. The functions of the white cane as described above are realized by the communication of each component.

In addition, there are individual differences in how people perceive a sense of distance due to sound. The relationship between how the user perceives the distance and the size of the sound image may be learned in advance, and the size of the sound image may be adjusted according to the user's recognition pattern.

Furthermore, by adjusting the size of the sound image according to whether the user is walking or standing still, a representation that allows the user to easily perceive the sense of distance may be provided.

Presentation of Map Information Using Sound

Figure 15:
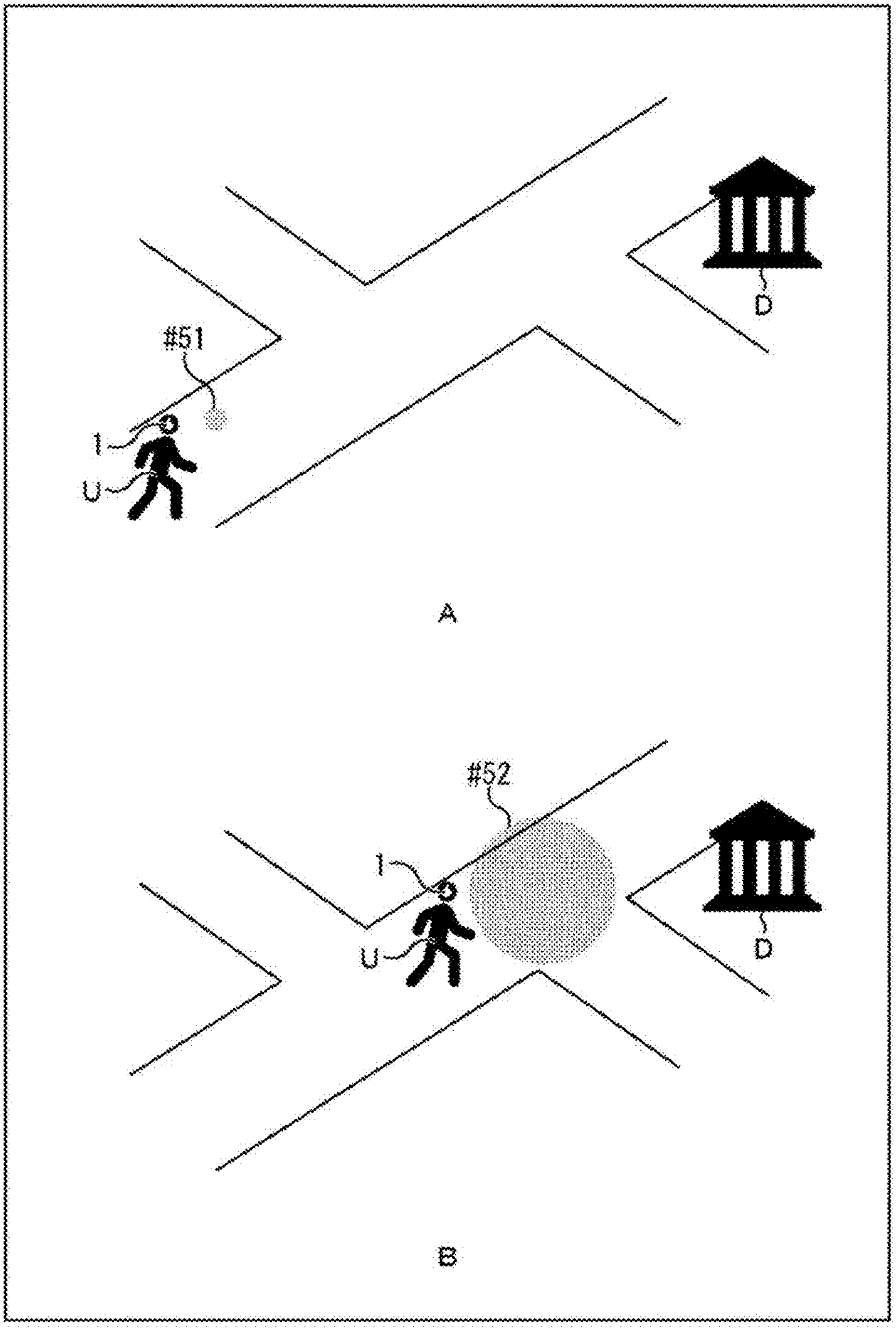
FIG. 15 is a diagram showing an example of a method of notifying the distance to the destination to which the present technology is applied.

FIG. 15 is a diagram illustrating an example of a method of notifying the distance to the destination to which the present technology is applied.

In FIG. 15, it is assumed that a user U possesses the information processing apparatus 10 (not shown) and is walking toward a destination D having a store or the like.

The information processing apparatus 10 possessed by the user U includes a position detection unit that detects the current position of the user U and a surrounding information acquisition unit that acquires information such as surrounding stations.

In this application example, the information processing apparatus 10 acquires the position of the user U by the position detection unit, and acquires the surrounding information by the surrounding information acquisition unit. Further, the information processing apparatus 10 controls the size of the sound image presented to the user U according to the distance to the destination D, thereby allowing the user U to immediately perceive the sense of distance to the destination D.

For example, the information processing apparatus 10 increases the size of the sound image of the sound representing the destination D as the user U approaches the destination D. This allows the user U to perceive that the distance to the destination D is short.

FIG. 15A is a diagram showing an example of a sound image when the distance to the destination D is long. In this case, the sound representing the destination D is presented as the sound with a small sound image as indicated by a small colored circle #51.

FIG. 15B is a diagram showing an example of a sound image when the distance to the destination D is short. In this case, the sound representing the destination D is presented as the sound with a large sound image as indicated by a colored circle #52.

In this way, it is possible to present map information using sound for the user to go to a destination in an easy-to-understand manner using spatial sound.

Further, by changing the size of the sound image according to the amount of noise in the surroundings, it is possible to make the representation easier to understand.

Example of Notification Sound

Figure 16:
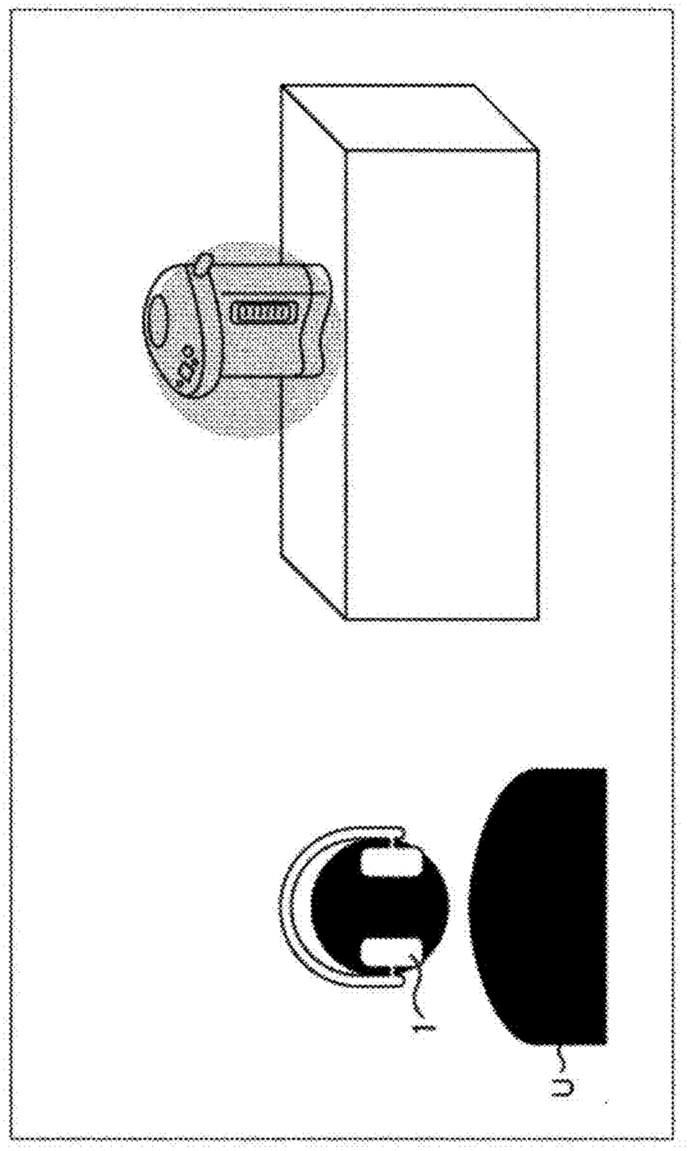
FIG. 16 is a diagram showing an example of a notification sound notification method of a home appliance to which the present technology is applied.

FIG. 16 is a diagram illustrating an example of a notification sound notification method of a home appliance to which the present technology is applied.

FIG. 16 shows how the user U is presented with the notification sound of a kettle, for example.

The information processing apparatus 10 possessed by the user U includes a detection unit that detects the degree of urgency and importance of the contents of the notification in cooperation with other devices such as household electric appliances (home appliances).

In this application example, the information processing apparatus 10 changes the size of the sound image of the notification sound of the home appliance according to the degree of urgency and importance detected by the detection unit, thereby immediately inform the user U of the degree of urgency and importance of the notification sound.

According to this application example, even if the user U does not notice the monotonous buzzer sound from the speaker installed in the home appliance, the notification sound of the home appliance is presented by increasing the size of the sound image. Thus, it is possible to make the user U notice the notification sound of the home appliance.

The degree of urgency and importance of the notification sound of the home appliance is set according to the danger, for example. When the water boils, it is dangerous to leave it as it is without noticing the notification sound. A high level is set as the degree of urgency and importance for notification in this case.

Although the home appliance has been described as a kettle, the present invention can also be applied to presentation of notification sounds of other home appliances. Applicable home appliances include refrigerators, microwave ovens, rice cookers, dishwashers, washing machines, water heaters, and vacuum cleaners. Moreover, the examples given here are general ones, and are not limited to those illustrated.

Further, when it is desired to draw the user's attention to a specific part of a device, it is possible to guide the user's line of sight by gradually reducing the area of the caution sound. The specific parts of the device are, for example, switches, buttons, touch panels, and the like provided in the device.

In this way, according to the present technology, it is possible to allow the user to perceive a sense of distance to the virtual sound source, present the user with the importance and urgency of the notification sound of the device, and guide the user's line of sight.

Example of Teleconference System

Figure 17:
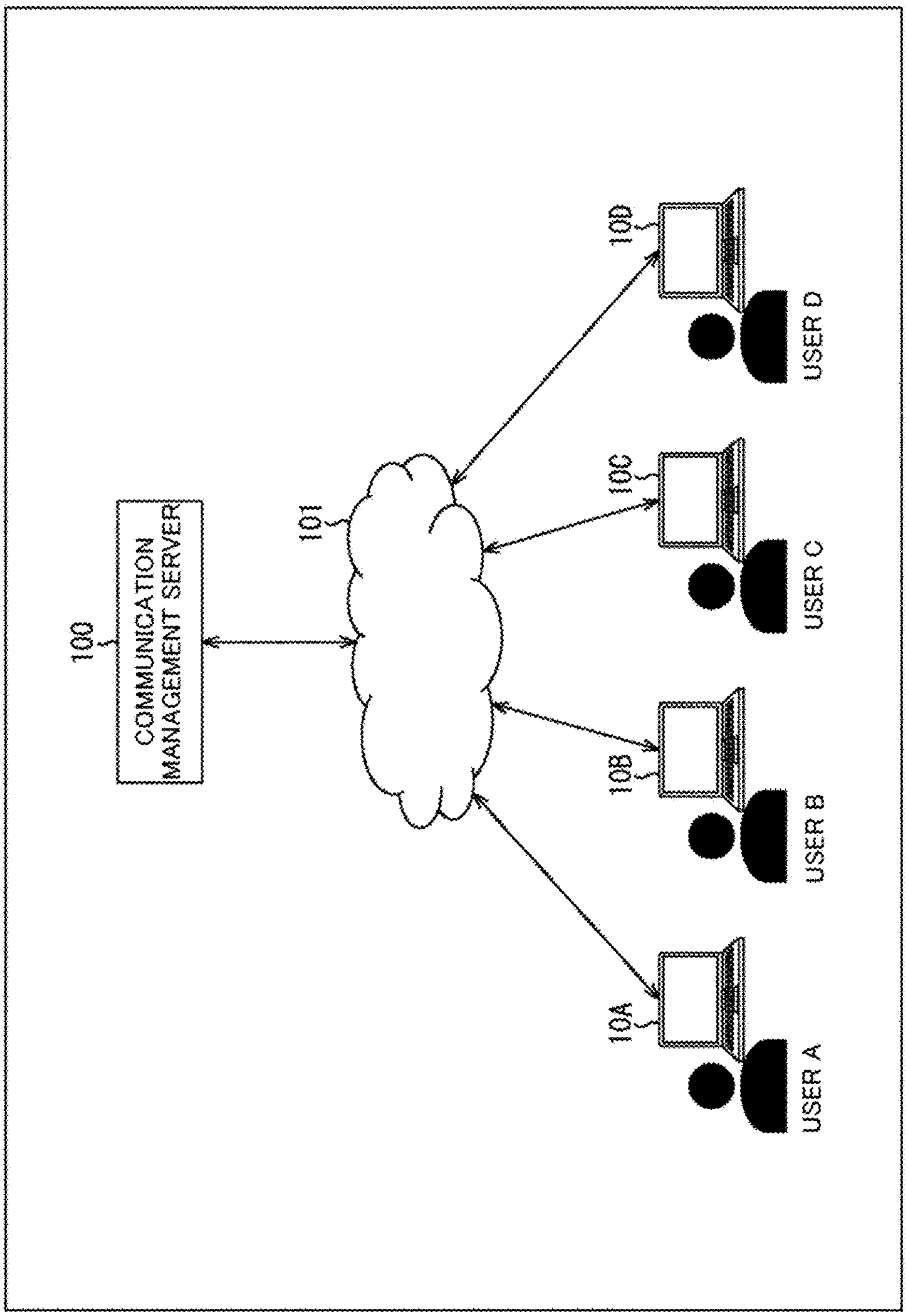
FIG. 17 is a diagram showing a configuration example of a teleconference system.

FIG. 17 is a diagram illustrating a configuration example of a teleconference system.

FIG. 17 shows, for example, remote users A to D having a conference via a network 101 such as the Internet. A communication management server 100 is connected to the network 101.

The communication management server 100 controls transmission and reception of voice data between users. Voice data transmitted from the information processing apparatus 10 used by each user is mixed in the communication management server 100 and distributed to all the information processing apparatuses 10.

The communication management server 100 also manages the position of each user on the space map, and outputs each user's voice as sound having a sound image whose size corresponds to the distance between the users on the space map. The communication management server 100 has functions similar to those of the information processing apparatus 10 described above.

The users A to D wear the headphones 1 and participate in the teleconference using the information processing apparatuses 10A to 10D, respectively. Each information processing apparatus 10 has microphones built therein or connected thereto, and is installed with a program for using the teleconference system.

Figure 18:
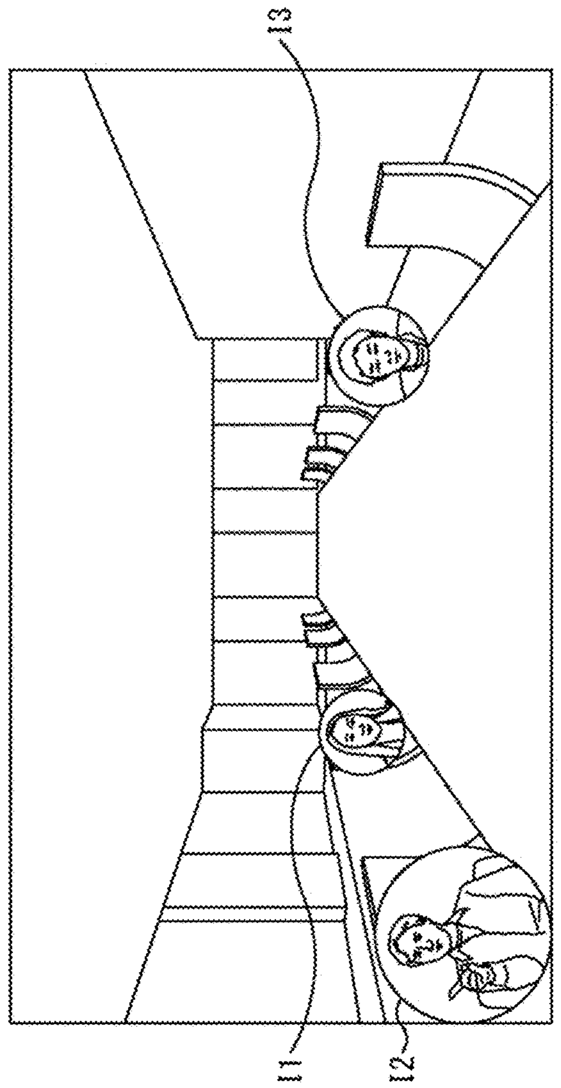
FIG. 18 is a diagram showing a display example of a screen serving as a user interface during a teleconference.

FIG. 18 is a diagram showing a display example of a screen serving as a user interface during a teleconference.

The example of FIG. 18 is a screen of a teleconference system, and users are represented by circular icons I1, I2, and I3. The icons I1 to I3 represent, for example, users A to C, respectively. A user who participates in the teleconference by viewing the screen of FIG. 18 is user D, for example.

User D can set the distance to a desired user by moving the position of the icon and controlling the position of each user on the space map. In the example of FIG. 18, for example, the position of user B represented by icon I2 is set near, and the position of user A represented by icon I1 is set further away.

Figure 19:
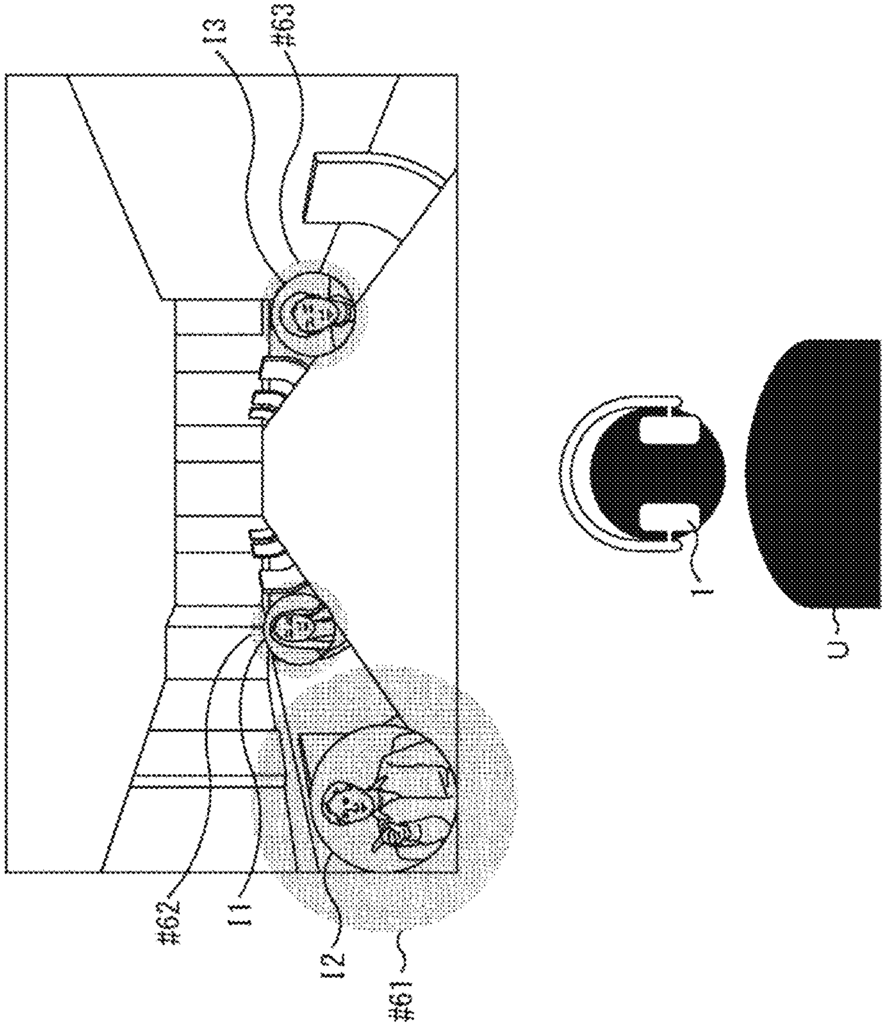
FIG. 19 is a diagram showing an example of the size of the sound image of each user's voice.

FIG. 19 is a diagram showing an example of the size of the sound image of each user's voice. The user U facing the screen is the user D, for example.

As indicated by a colored circle #61, the voice of user B, who is set at a close position on the space map, is output as sound with a large sound image according to the distance. As indicated by circles #62 and #63, the voices of users A and C are output as sounds with sound images whose sizes correspond to their respective distances.

If the voices of all users are mixed as monaural voices and output from the headphones 1, the positions of the speakers are aggregated at one point, so that the cocktail party effect is unlikely to occur, and the user cannot pay attention to the voice of a specific speaker and listen to it. In addition, it becomes difficult to have group discussions among a plurality of groups.

In this way, by controlling the size of the sound image of the voice of each speaker according to the position of each speaker, it is possible to represent the sense of distance between the user and each speaker.

By representing the distance to each speaker who is present at the conference, the user can have a conversation while feeling a sense of perspective.

The voice of the speaker to be grouped may be output as a voice with a large sound image as if it is localized at a position close to the ear. This makes it possible to represent the feeling of a group of speakers.

Each information processing apparatus 10 may have an HMD, a camera, or the like built therein or connected thereto. By detecting the direction of the user's face using an HMD or camera and by increasing the size of a sound image of the voice of a speaker that the user is paying attention to when detecting that the user is paying attention to a specific speaker, it is possible to make the user feel as if the specific speaker is speaking close to the user.

In this example, each user can control the positions of other users (speakers), but the present invention is not limited to this. For example, it is conceivable that each of the participants in the conference controls their own position or other participants' positions on the space map, and the positions set by someone are shared among all the participants.

Example of Simulated Car Engine Sound

Figure 20:
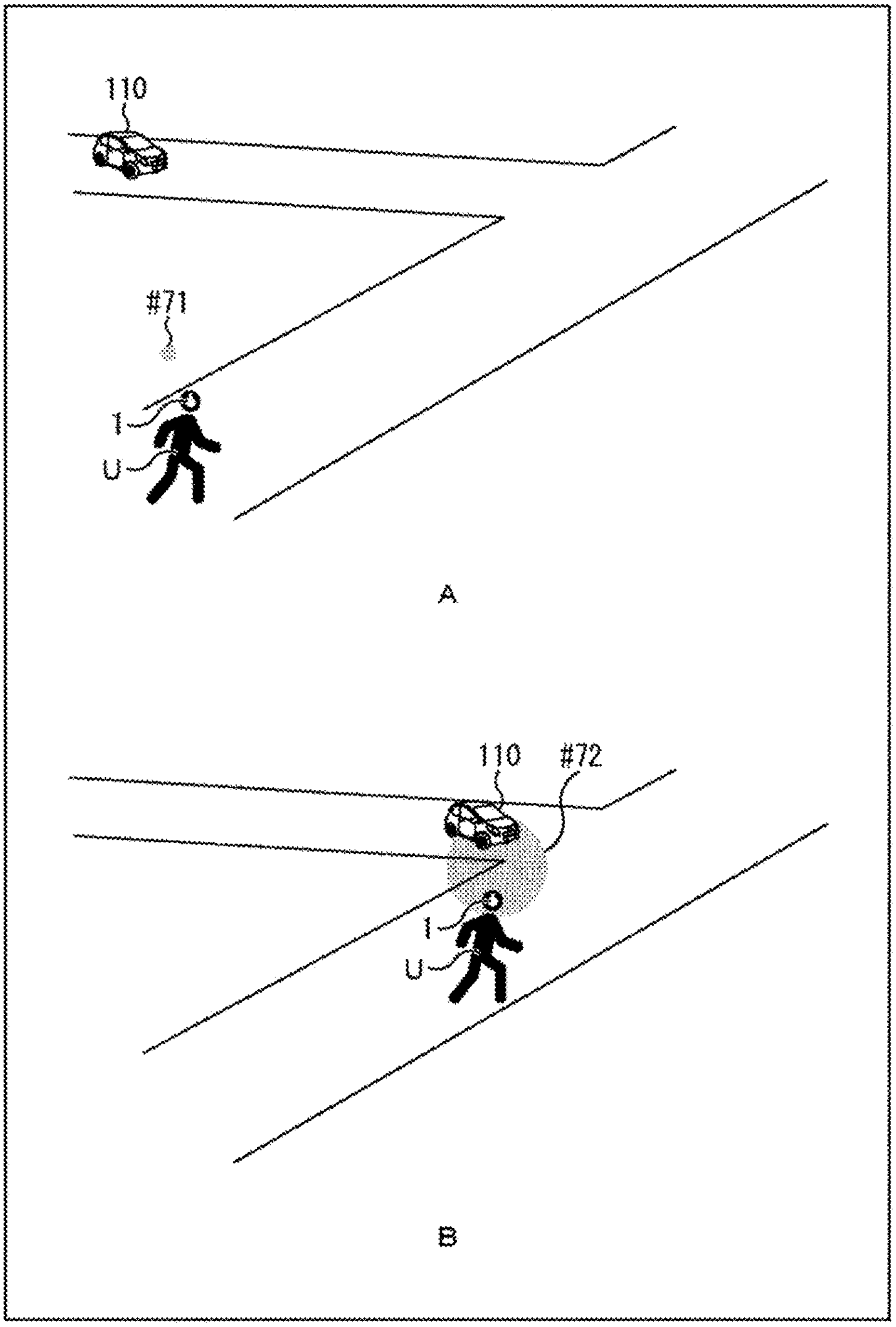
FIG. 20 is a diagram showing an example of a method of notifying a simulated engine sound of a car.

FIG. 20 is a diagram showing an example of a method of notifying a simulated engine sound of a car.

Pedestrians are thought to recognize traveling cars mainly based on visual and auditory information, but the engine sound of recent electric cars is low, making it difficult for pedestrians to notice. Moreover, even if the sound of a car is heard, if other noises are heard together, it is difficult to notice that a car is approaching.

In this application example, the simulated engine sound emitted by a car 110 is made to be heard by a user U, who is a pedestrian, so that the traveling car 110 is noticed. The car 110 is equipped with a device having functions similar to those of the information processing apparatus 10. The user U walking while wearing the headphones 1 hears the simulated engine sound output from the headphones 1 under the control of the car 110.

In this application example, the car 110 includes a camera for detecting the user U who is a pedestrian, and a communication unit for transmitting a simulated engine sound as approach information to the user U walking nearby.

When the car 110 detects the user U, the car 110 generates a simulated engine sound having a sound image whose size corresponds to the distance to the user U. The simulated engine sound generated based on the central sound and the ambient sound is transmitted to the headphones 1 and presented to the user U.

FIG. 20A is a diagram showing an example of a sound image when the distance between the car 110 and the user U is long. In this case, the simulated engine sound is presented as a sound with a small sound image as indicated by a small colored circle #71.

FIG. 20B is a diagram showing an example of a sound image when the distance between the car 110 and the user U is short. In this case, the simulated engine sound is presented as a sound with a large sound image as indicated by a colored circle #72.

The simulated engine sound based on the central sound and the ambient sound may be generated in the information processing apparatus 10 possessed by the user U instead of in the car 110.

According to the present technology, it is possible to allow the user U to perceive the sense of distance to the car 110 as well as the direction of arrival of the car 110, and to improve the accuracy of danger avoidance.

Notification using the simulated engine sound as described above can be applied not only to cars with low engine sound, but also to conventional cars. By exaggerating the sense of distance by causing the user to hear a simulated engine sound with a sound image whose size corresponds to the distance, it is possible to make the user perceive that the car is approaching and improve the accuracy of danger avoidance.

Example of Obstacle Warning Sound of Car

Although there are already systems that give audible warnings when a car is close to a wall, such as when the car is parked, the user may not feel the sense of distance between the car and the wall.

In this application example, the car is equipped with a camera for detecting approaching walls. Also in this case, the car is equipped with a device having the same function as the information processing apparatus 10.

The device mounted on the car detects the distance between the car body and the wall based on the image captured by the camera, and controls the size of the sound image of the warning sound. The closer the car body is to the wall, the louder the warning sound is output. By perceiving the sense of distance to the wall from the size of the sound image of the warning sound, it is possible to improve the accuracy of danger avoidance.

Example of Predictive Fish School Detection

The present technology can be also applied to presentation of schools of fish by a predictive fish school detection device. For example, the larger the area of the school of fish, the larger the sound image of the presented warning sound. This allows the user to immediately determine the predicted value of the size of the school of fish.

Example of Sound Space Representation

The present technology allows the user to perceive a sense of distance from the virtual sound source. In addition, by changing the area of the reverberant sound (the size of the sound image) relative to the direct sound, it is possible to represent the expansion of space. That is, by applying the present technology to reverberant sound, it is possible to represent a sense of depth.

In addition, by representing the area of the reverberant sound by reducing the amount of change according to the user's familiarity, it is possible to reduce the stimulation burden on the user.

The perception of sound differs depending on whether the sound is coming from the front, the side, or the back of the face. By providing parameters suitable for each direction as parameters related to area representation, representation appropriate for the presentation direction of the sound can be provided.

Examples of Video Content and Movies

The present technology can be applied to presentation of sound for various contents such as video contents such as movies, audio contents, and game contents. By setting an object in the contents as a virtual sound source and controlling the central sound and ambient sound, it is possible to realize an experience as if the virtual sound source approaches or moves away from the user.

6. Other Examples

Configuration of Reproducing Device

Figure 21:
FIG. 21 is a diagram for explaining an example of a reproducing device.
Figure 21:

FIG. 21 is a diagram illustrating an example of the reproducing device.

Closed headphones (over-ear headphones) as shown in FIG. 21A or shoulder-mounted neckband speakers as shown in FIG. 21B may be used as the reproducing device used for outputting the sound of a virtual sound source. The left and right units of the neckband speakers are provided with speakers, and sound is output toward the user's ears.

Figure 22:
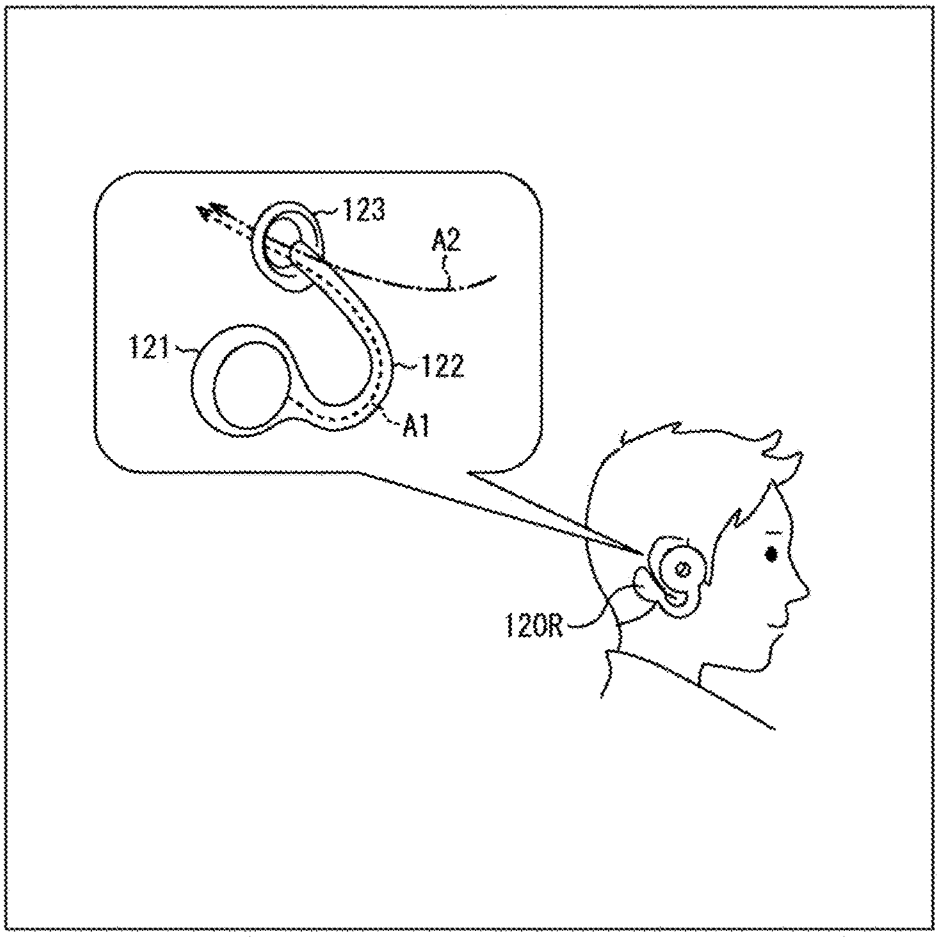
FIG. 22 is a diagram for explaining another example of a reproducing device.

FIG. 22 is a diagram illustrating another example of the reproducing device.

The reproducing device shown in FIG. 22 is open-type earphones.

The open-type earphones shown in FIG. 22 are composed of a right unit 120R and a left unit 120L (not shown). As shown enlarged in the balloon in FIG. 22, the right unit 120R includes a driver unit 121 and a ring-shaped mounting part 123 which are joined together via a U-shaped sound conduit 122. The right unit 120R is mounted by pressing the mounting part 123 around the outer ear hole so that the right ear is sandwiched the mounting part 123 and the driver unit 121.

The left unit 120L has the same structure as the right unit 120R. The left unit 120L and the right unit 120R are connected wired or wirelessly.

The driver unit 121 of the right unit 120R receives an audio signal transmitted from the information processing apparatus 10 and generates sound according to the audio signal and causes sound corresponding to the audio signal to be output from the tip of the sound conduit 122 as indicated by the arrow A1. A hole for outputting sound to the outer earhole is formed at the junction of the sound conduit 122 and the mounting part 123.

The mounting part 123 is shaped like a ring. Along with a sound outputted from the tip of the sound conduit 122, an ambient sound also reaches the outer earhole as indicated by an arrow A2.

In this way, it is possible to use open earphones that do not seal the ear canal.

These reproducing devices may be provided with a detection unit that detects the direction of the user's head. When a detection unit that detects the direction of the user's head is provided, the HRTF information used in the convolution processing is adjusted so that the position of the virtual sound source is fixed even if the direction of the user's head changes.

Program

The above-described series of processing can be executed by software and can be executed by hardware. When the series of processing is performed by software, a program for the software to be installed from a program recording medium to a computer embedded in dedicated hardware or a general-purpose personal computer.

The installed program is provided by being recorded in a removable medium configured as an optical disc (a compact disc-read only memory (CD-ROM), a digital versatile disc (DVD), or the like), a semiconductor memory, or the like. In addition, the program may be provided through a wired or wireless transmission medium such as a local area network, the Internet or digital broadcasting. The program can be installed in a ROM or a storage unit in advance.

The program executed by the computer may be a program that performs a plurality of steps of processing in time series in the order described in the present specification or may be a program that performs a plurality of steps of processing in parallel or at a necessary timing such as when a call is made.

Meanwhile, in the present specification, a system is a collection of a plurality of constituent elements (devices, modules (components), or the like) and all the constituent elements may be located or not located in the same casing. Thus, a plurality of devices housed in separate housings and connected via a network, and one device in which a plurality of modules are housed in one housing are both systems.

The effects described in the present specification are merely examples and are not limited, and other effects may be obtained.

The embodiments of the present technology are not limited to the aforementioned embodiments, and various changes can be made without departing from the gist of the present technology.

For example, the present technique may be configured as cloud computing in which a plurality of devices share and cooperatively process one function via a network.

In addition, each step described in the above flowchart can be executed by one device or executed in a shared manner by a plurality of devices.

Furthermore, in a case in which one step includes a plurality of processes, the plurality of processes included in the one step can be executed by one device or executed in a shared manner by a plurality of devices.

Combination Examples of Configurations

The present technology can be configured as follows.

(1)

An information processing apparatus including;

a sound source setting unit that sets a first sound source, and a plurality of second sound sources at positions corresponding to a size of a sound image of a first sound that is a sound of the first sound source; and an output control unit that outputs first sound data obtained by convolution processing using HRTF information corresponding to a position of the first sound source and a plurality of pieces of second sound data obtained by convolution processing using HRTF information corresponding to the positions of the second sound sources, wherein the second sound sources are set to be positioned around the first sound source.

(2)

The information processing apparatus according to (1), wherein the sound source setting unit sets the second sound sources around the first sound source.

(3)

The information processing apparatus according to (1) or (2), wherein the sound source setting unit sets the second sound sources to positions further away from the first sound source as the size of the sound image of the first sound increases.

(4)

The information processing apparatus according to any one of (1) to (3), wherein the second sound sources are composed of four sound sources set around the first sound source.

(5)

The information processing apparatus according to any one of (1) to (4), wherein the sound source setting unit sets the second sound sources at positions corresponding to a shape of the sound image of the first sound.

(6)

The information processing apparatus according to any one of (1) to (5), wherein the output control unit outputs two-channel audio data representing the first sound and a second sound, which is a sound of the second sound source, from a reproducing device worn by a user.

(7)

The information processing apparatus according to (6), wherein the output control unit adjusts a volume of each of the first sound and the second sound according to the size of the sound image of the first sound.

(8)

The information processing apparatus according to any one of (2) to (7), wherein the sound source setting unit determines whether the size of the sound image of the first sound changes, and controls the position of the second sound source according to the size of the sound image of the first sound.

(9)

The information processing apparatus according to any one of (2) to (5), wherein the first sound and the second sounds of the plurality of second sound sources are sounds for representing a virtual sound source corresponding to an object.

(10)

The information processing apparatus according to any one of (2) to (9), further including:

a detection unit that detects user's current position information and user's destination information, wherein the sound source setting unit sets the position of the first sound source based on the current position information and sets the position of the second sound source using the destination information.

(11)

An information processing method for causing an information processing apparatus to execute processing including:

setting a first sound source and a plurality of second sound sources at positions corresponding to a size of a sound image of a first sound that is a sound of the first sound source; and outputting first audio data obtained by convolution processing using HRTF data corresponding to a position of the first sound source and a plurality of pieces of second audio data obtained by convolution processing using HRTF data corresponding to the positions of the second sound sources, set so as to be positioned around the first sound source.

(12)

A program for causing a computer to execute processing including:

setting a first sound source and a plurality of second sound sources at positions corresponding to a size of a sound image of a first sound that is a sound of the first sound source; and outputting first audio data obtained by convolution processing using HRTF data corresponding to a position of the first sound source and a plurality of pieces of second audio data obtained by convolution processing using HRTF data corresponding to the positions of the second sound sources, set so as to be positioned around the first sound source.

REFERENCE SIGNS LIST

1 Headphones
10 Information processing apparatus
30 Information processing unit
31 Sound source setting unit
32 Spatial sound generation unit
33 Output control unit
50 Reproducing device
60 Virtual sound source data providing server
70 HRTF server
100 Communication management server
101 Network
U User C Central sound source LU, RU, LD, RD Ambient sound source

The invention claimed is:

1. An information processing system comprising:

circuitry configured to:

control to set a first sound source, and a plurality of second sound sources at positions corresponding to a size of a sound image of a first sound that is a sound of the first sound source; and control to output first sound data obtained by convolution processing using HRTF information corresponding to a position of the first sound source and a plurality of pieces of second sound data obtained by convolution processing using HRTF information corresponding to the positions of the second sound sources, wherein the second sound sources are set to be positioned around the first sound source, wherein the second sound sources are composed of four sound sources set around the first sound source.

2. The information processing system according to claim 1, wherein the circuitry is configured to set the second sound sources around the first sound source.

3. The information processing system according to claim 1, wherein the circuitry is configured to control to set the second sound sources to positions further away from the first sound source as the size of the sound image of the first sound increases.

4. The information processing system according to claim 1, wherein the circuitry is configured to control to set the second sound sources at positions corresponding to a shape of the sound image of the first sound.

5. The information processing system according to claim 1, wherein the circuitry is configured to control to output two-channel audio data representing the first sound and a second sound, which is a sound of the second sound source, from a reproducing device worn by a user.

6. The information processing system according to claim 5, wherein the circuitry is configured to control to adjust a volume of each of the first sound and the second sound according to the size of the sound image of the first sound.

7. The information processing system according to claim 2, wherein the circuitry is configured to control to determine whether the size of the sound image of the first sound changes, and controls the position of the second sound source according to the size of the sound image of the first sound.

8. The information processing system according to claim 2, wherein the first sound and the second sounds of the plurality of second sound sources are sounds for representing a virtual sound source corresponding to an object.

9. The information processing system according to claim 2, wherein the circuitry is further configured to:

control to detect a user's current position information and user's destination information, wherein the circuitry is configured to control to set the position of the first sound source based on the current position information and sets the position of the second sound source using the destination information.

10. An information processing method for causing an information processing apparatus to execute processing comprising:

setting a first sound source and a plurality of second sound sources at positions corresponding to a size of a sound image of a first sound that is a sound of the first sound source; and outputting first audio data obtained by convolution processing using HRTF data corresponding to a position of the first sound source and a plurality of pieces of second audio data obtained by convolution processing using HRTF data corresponding to the positions of the second sound sources, set so as to be positioned around the first sound source, wherein the second sound sources are composed of four sound sources set around the first sound source.

11. A non-transitory computer readable medium configured to cause a computer to execute processing comprising:

setting a first sound source and a plurality of second sound sources at positions corresponding to a size of a sound image of a first sound that is a sound of the first sound source; and outputting first audio data obtained by convolution processing using HRTF data corresponding to a position of the first sound source and a plurality of pieces of second audio data obtained by convolution processing using HRTF data corresponding to the positions of the second sound sources, set so as to be positioned around the first sound source, wherein the second sound sources are composed of four sound sources set around the first sound source.

* * * * *